(12) United States Patent
Lynd et al.

(10) Patent No.: US 8,911,639 B2
(45) Date of Patent: Dec. 16, 2014

(54) POLYMER ELECTROLYTES BASED ON POLY(GLYCIDYL ETHER)S

(75) Inventors: Nathaniel A. Lynd, Goleta, CA (US); Glenn H. Fredrickson, Santa Barbara, CA (US); Craig J. Hawker, Santa Barbara, CA (US); Edward J. Kramer, Santa Barbara, CA (US); Kate Barteau, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 174 days.

(21) Appl. No.: 13/329,179

(22) Filed: Dec. 16, 2011

(65) Prior Publication Data

US 2012/0326073 A1  Dec. 27, 2012

Related U.S. Application Data

(60) Provisional application No. 61/423,854, filed on Dec. 16, 2010.

(51) Int. Cl.
*H01G 9/15* (2006.01)
*H01M 10/0565* (2010.01)
*G02F 1/153* (2006.01)
*C08L 71/00* (2006.01)

(52) U.S. Cl.
CPC ............. *C08L 71/00* (2013.01); *C08G 2650/56* (2013.01)
USPC .......... 252/62.2; 429/306; 429/317; 361/525; 359/270

(58) Field of Classification Search
USPC ............ 252/62, 62.2; 429/306, 317; 361/525; 359/270
See application file for complete search history.

(56) References Cited

U.S. PATENT DOCUMENTS

| 4,705,728 | A | * | 11/1987 | Gregory ........................ 429/311 |
| 5,755,985 | A | * | 5/1998 | Vallee et al. .................. 252/62.2 |
| 6,180,287 | B1 | | 1/2001 | Watanabe et al. | |
| 8,659,874 | B2 | * | 2/2014 | Shaffer et al. .................. 361/502 |
| 2005/0231894 | A1 | | 10/2005 | Yoshida et al. | |

OTHER PUBLICATIONS

PCT Search Report issued Apr. 19, 2012 in connection with PCT/US2011/065647.
Tarascon, J,-M. et al., "Issues and challenges facing lithium ion batteries". Nature, vol. 414, Nov. 15, 2001, pp. 359-367.
Alloin, F. et al., "Conductivity Measurements of LiTFSI Triblock Copolymers with a Central POE Sequence". Electrochemica Acta, vol. 37, No. 9, 1992, pp. 1729-1731.
Alloin, F. et al., "Triblock copolymers and networks incorporating oligo (oxyethylene) chains". Solid State Ionics 60 (1993), pp. 3-9.
Alloin, F. et al., "Electrochemical Behavior of Lithium Electrolytes Based on New Polyether Networks". Journal of the Electrochemical Society, vol. 141, No. 7, Jul. 1994, pp. 1915-1920.
Alloin, F. et al., "New Solvating Polyether Networks". Electrochemica Acta, vol. 40, No. 13, 1995, pp. 2269-2276.
Cruz, A. et al., "Cross-linking effect on thermal, conducting and electrochemical properties of an elastomeric polymer electrolyte". Solid State Ionics (159) 2003, pp. 301-311.
Matoba, Y. et al., "Conductivity of Crosslinked Poly(Epichlorohydrin-co-(Ethylene Oxide)-co-(Allyl Glycidyl Ether)) Compositions under Ambient Circumstances for Its Application to an Electrophotographic System". Journal of Applied Polymer Science, vol. 98, 2005, pp. 825-830.
Singh, M. et al., "Effect of Molecular Weight on the Mechanical and Electrical Properties of Block Copolymer Electrolytes". Macromolecules, 40, 2007, pp. 4578-4585.
Panday, A. et al., "Effect of Molecular Weight and Salt Concentration on Conductivity of Block Copolymer Electrolytes". Macromolecules 2009, 42, pp. 4632-4637.
Soo, P. et al., "Rubbery Block Copolymer Electrolytes for Solid-State Rechargeable Lithium Batteries". Journal of the Electrochemical Society, 146 (1), 1999, pp. 32-37.
Nishimoto, A. et al., "High ionic conductivity of new polymer electrolytes based on high molecular weight polymer comb polymers". Electrochemica Acta, vol. 43, Nos. 10-11, 1998, pp. 1177-1184.
Hawker, C. et al., "Hyperbranched Poly(ethylene glycol)s: A New Class of Ion-Conducting Materials". Macromolecules 1996, 29, pp. 3831-3838.
Xinling, W., et al., "Synthesis and Ionic Conductivity of Hyperbranched Poly(glycidol)". School of Chemistry and Chemical Technology, 2001, pp. 2225-2230.
Watanabe, M. et al., "Polymer electrolytes derived from dendritic polyether macromonomers". Solid State Ionics 148 (2002), pp. 399-404.
Matoba, Y. et al., "Electrochemical properties of composite polymer electrolyte applied to rechargeable lithium polymer battery". Journal of Power Sources 137 (2004), pp. 284-287.
Roux, C. et al., "Physical Properties of (PPO)n(LiTFSI) polymer elctrolytes:nuclear magnetic resonance investigation and comparison with (PEO)n(LiTFSI)". J. Phys. Condens. Matter 8 (1996), pp. 7005-7017.
Labbe, A. et al., "Controlled Polymerization of Glycidyl Methyl Ether Initiated by Onium Salt/Triisobutylaluminum and Investigation of the Polymer LCST". Macromol Symp., 2007, pp. 249-250, 332-397.
Yamane, M. et al., "Dielectric Study of Terminal Chain Dynamics, Segmental Motion, and Rotation of Side Groups in Polyethers of Type ABC". Macromolecules 2005, pp. 10686-10693.
Goodenough, J. et al., "Challenges for Rechargeable Li Batteries". Chemistry of Materials 22, 2010, pp. 587-603.
Rey, I. et al., "Infrared and Raman study of the PEO-LiTFSI polymer electrolyte". Electrochemica Acra., vol. 43, Nos. 10-11, 1998. pp. 1505-1510.
International Preliminary Report on Patentability dated Jun. 27, 2013 for PCT application No. PCT/US2011/065647.

* cited by examiner

*Primary Examiner* — Carol M Koslow
(74) *Attorney, Agent, or Firm* — Gates & Cooper LLP

(57) ABSTRACT

A polymer electrolyte composition including a metal salt and at least one polymer comprising a poly(glycidyl ether), where the at least one polymer is amorphous at ambient temperature. The poly(glycidyl ether) polymer can be a blend of poly (glycidyl ether) polymers, can be a poly(glycidyl ether) polymer blended with a mechanically strong solid polymer, and can be a block of a block copolymer that also includes a polymer block forming a mechanically strong solid polymer.

7 Claims, 5 Drawing Sheets

POLYMER ELECTROLYTES BASED ON POLY(GLYCIDYL ETHER)S

CROSS REFERENCE TO RELATED APPLICATIONS

This application claims the benefit of Provisional Patent Application No. 61/423,854, filed on Dec. 16, 2010, which is incorporated by reference herein

STATEMENT REGARDING FEDERALLY SPONSORED RESEARCH OR DEVELOPMENT

This invention was made with Government support under Grant No. DMR 05-20415 from the National Science Foundation. The Government has certain rights in this invention.

BACKGROUND

1. Field of the Invention
The invention relates to polymer electrolytes.

2. Related Art
(Note: This application references a number of different publications as indicated throughout the specification by one or more reference numbers in brackets, e.g., [x]. A list of these different publications ordered according to these reference numbers can be found below in the section entitled "References.")

As our energy economy begins to rely on renewable, but more intermittent energy sources such as solar and wind, safe, high-energy density storage will be come increasingly important. Polymer electrolytes hold promise for the development of higher energy density lithium-ion batteries that can be adapted to a variety of applications. By eliminating the need for volatile, flammable, and toxic small-molecule electrolytes, these solvent-free solid-state batteries, in which a moderate to high molecular weight polymer is mixed with a lithium salt, also increase battery safety and introduce new degrees of design flexibility. The greatest motivation behind the design of solid polymer electrolytes is that highly-energetic metallic lithium anodes may be safely used in lieu of less-energetic intercalation compound anodes [1]. The dominant challenge to advancing these materials commercially has been the development of a polymer material that is able to dissolve and dissociate lithium salts and allow for lithium ion mobility while maintaining mechanical strength and electrode separation. To date, poly(ethylene oxide) (PEO) has been the most frequently and thoroughly studied polymer electrolyte due to its good solvating properties and conductivities greater than $10^{-4}$ S/cm above 70° C. However, below 65° C., PEO conductivity drops off dramatically as a result of crystallization, thus making PEO ill-suited for most battery applications that require operation at ambient temperatures. As a result, recent work has sought to modify PEO to eliminate crystallinity while retaining good solvating, conducting, and structural properties. Strategies employed include PEO oligomer crosslinking [2-7], synthesis of rubbery block copolymers [8,9] with or without incorporation of plasticizing agents [10], and most successfully, development of supramolecular architectures such as combs [11] and dendritic structures [12-14]. While these techniques have yielded increases in conductivity at lower temperatures, as yet they have been unable to meet the requisite conductivity of $10^{-3}$ S/cm deemed necessary for commercial viability. Moreover, continuing improvements have come at the cost of increasingly sophisticated synthetic schemes that might not be feasible on an industrial scale. Still yet other modifications have yielded systems that are increasingly similar to the small-molecule systems they are to replace [15].

SUMMARY

In one aspect, a polymer electrolyte composition comprising a metal salt and a polymer comprising poly(glycidyl ether) is provided, where the poly(glycidyl ether) is amorphous at ambient temperature. The poly(glycidyl ether) can have the structure (I), (II), (III) or (IV):

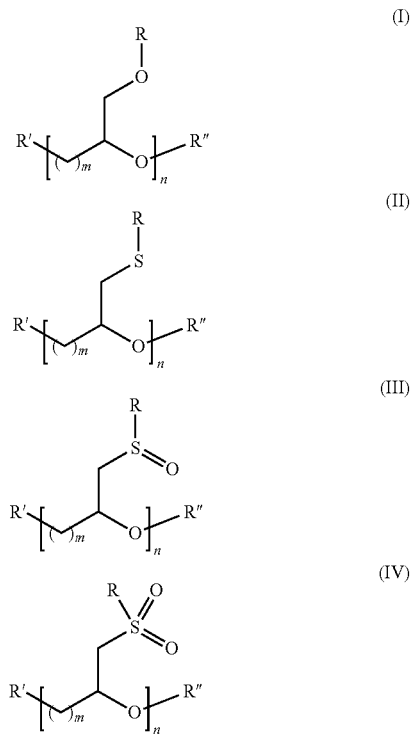

where: R is hydrogen or an aliphatic or aromatic group; R' is hydrogen, an aliphatic or aromatic group, an ether of an aliphatic or aromatic group, azide ($N_3$), a halogen (F, Cl, Br, I), or a perfluoroalkane; R" is hydrogen or an aliphatic or aromatic group; m=1 or 2; and n≥2. In some cases, R, R' and R" can each independently be a $C_{1-9}$ group having a linear, branched, cyclic, aliphatic or aromatic arrangement, or a combination thereof, where R' can further be an ether of the $C_{1-9}$ group. In the composition, the poly(glycidyl ether) can comprise a random or statistical copolymer of two or more glycidyl ether monomers. Also, the polymer in the composition can be blended with another polymer that comprises poly(alkyl glycidyl ether), and/or can be blended with at least one mechanically strong solid polymer, forming a polymer blend. In particular embodiments, the polymer can be blended with another polymer that is a polyether. Further, the polymer in the composition can be a linear or non-linear block copolymer comprising the poly(glycidyl ether) covalently bound to a polymer block that is a mechanically strong solid at room temperature. The composition in any embodiment can also include an ionic liquid, or an organic solvent that enhances ionic conductivity of the composition, or both.

In another aspect, a method of preparing a device is provided. The method includes incorporating a polymer electrolyte composition in the device, where the composition is the polymer electrolyte composition considered herein. The device can be a battery, a capacitor, a transistor, or an electrochromic window, or any device that includes a polymer electrolyte. In particular embodiments, the device is a battery, which can be a lithium polymer battery.

In a further aspect, a device comprising any polymer electrolyte composition considered herein is provided. The device can be a battery, a capacitor, a transistor, or an electrochromic window. In particular embodiments, the device is a battery, which can be a lithium polymer battery.

BRIEF DESCRIPTION OF THE DRAWINGS

For a more complete understanding of the present invention, reference is now made to the following descriptions taken in conjunction with the accompanying drawings.

DETAILED DESCRIPTION

Figure 1:
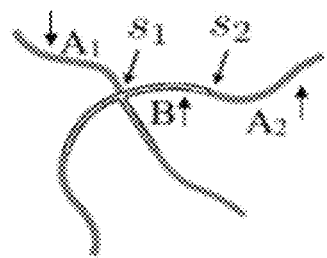
FIG. 1 is a drawing of a miktoarm star block polymer architecture where $A_1$ and $A_2$ refer to two compositionally identical polymer chains with the same or different lengths, B is a chemically distinct block, and $S_1$ and $S_2$ denote junctions between A and B blocks.

The embodiments described herein involving poly(glycidyl ether)-based polymer electrolytes are a dramatic improvement over poly(ethylene oxide)-based materials. In particular, poly(glycidyl ether)s possess good ionic conductivities at room temperature. Poly(glycidyl ether)s may be made by oxyanionic polymerization through the epoxide functionality on the monomer, with the resulting polymers typically appearing as viscous oils. A polymer electrolyte may be made, for example, by dissolving a lithium salt (e.g lithium bis(trifluoromethyl sulfonimide)) in the poly(glycidyl ether). To incorporate the polymer electrolyte in a solid polymer electrolyte, a block copolymer of a poly(glycidyl ether) with another, mechanically stronger polymer may be made. In addition, blends including a poly(glycidyl ether), a poly(glycidyl ether) block copolymer, or mechanically stronger polymer, or a combination thereof, may be made. In some embodiments, random copolymers between different glycidyl ethers or substituted ethylene oxides, or ethylene oxide itself, may be made, which may also be incorporated into blends.

In some embodiments, a polymer electrolyte composition including a metal salt and a polymer comprising a poly(glycidyl ether) is provided, where the poly(glycidyl ether) is amorphous at ambient temperature. In the composition, the poly(glycidyl ether) can be linear or branched. The poly(glycidyl ether) in any embodiment can have the structure (I), (II), (III), or (IV):

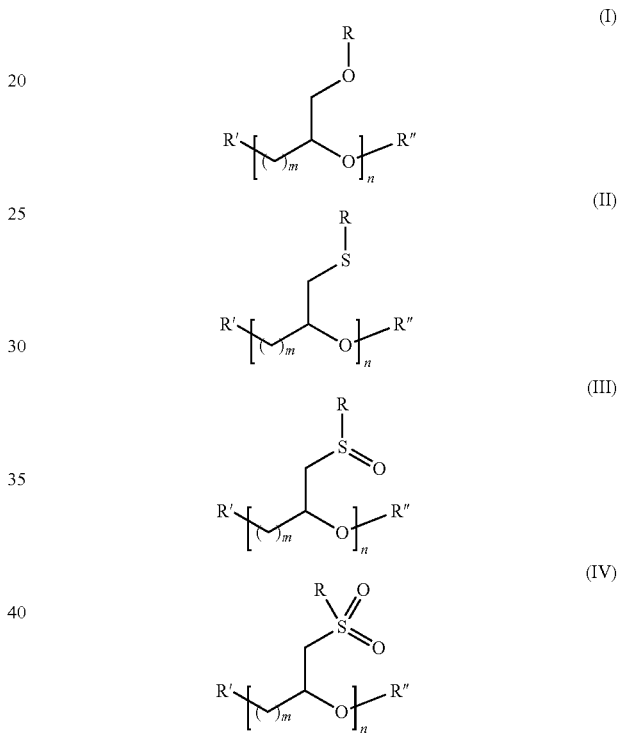

where: R is hydrogen or an aliphatic or aromatic group; R' is hydrogen, an aliphatic or aromatic group, an ether of an aliphatic or aromatic group, azide ($N_3$), a halogen (F, Cl, Br, I), or a perfluoroalkane; R" is hydrogen or an aliphatic or aromatic group; m=1 or 2; and n 2. For example, in some embodiments, n=2-2000. The aliphatic group in any of R, R', and R" can be a linear alkyl chain or a branched alkyl chain, which can be a $C_{1-9}$ linear or branched alkyl chain. In the poly(glycidyl ether) of structure (I)-(IV): R can be a $C_{1-9}$ group having a linear, branched, cyclic, aliphatic or aromatic arrangement, or a combination thereof; R' can be a $C_{1-9}$ group having a linear, branched, cyclic, aliphatic or aromatic arrangement, or a combination thereof, or R' can be an ether of the $C_{1-9}$ group; and R" can be a $C_{1-9}$ group having a linear, branched, cyclic, aliphatic or aromatic arrangement, or a combination thereof. In some cases, the poly(glycidyl ether) is poly glycidol. In any embodiment, the poly(glycidyl ether) can include a random or statistical copolymer of two or more glycidyl ether monomers. In any embodiment, the poly(glycidyl ether) can include a pendant linear or branched ether or oligomeric ether side chain with or without a thiol-ether linkage between the pendant ether and polymer backbone. The polymer electrolyte composition can have a conductivity of ≥$10^{-5}$ S/cm at room temperature, or ≥$10^{-4}$ S/cm at 80° C.

In additional aspects, the polymer can be blended with one or more poly(alkyl glycidyl ether) polymers having different average molar masses, having different chemical identities, or having the same or different chemical identity and the same or different molar masses. In any embodiment, the poly(glycidyl ether) polymer can be blended with at least one mechanically strong solid polymer. In any embodiment, the poly(glycidyl ether) polymer can be a linear or non-linear block copolymer comprising the poly(glycidyl ether) covalently bound to a polymer block that is a mechanically strong solid at room temperature. In embodiments including a poly(glycidyl ether) block copolymer, a plurality of block copolymers of different chemical identity and/or molar masses can be blended together. In embodiments including a poly(glycidyl ether) block copolymer, the poly(glycidyl ether) polymer can be in the form of a solid mesostructured material with ionically conductive domains made up mostly of poly(glycidyl ether) polymer material. For example, in some embodiments, the ionically conductive domains can include >50 wt %, >60 wt %, >70 wt %, >80 wt %, or >90 wt % poly(glycidyl ether) polymer material. In embodiments including a poly(glycidyl ether) polymer blended with a mechanically strong solid polymer, the mechanically strong solid polymer can include one or more block copolymers, each block copolymer including poly(glycidyl ether) and/or another mechanically-strong polymer that is solid at room temperature, such as polystyrene, polyethylene, or polypropylene. In any embodiment including a block copolymer or polymer blend, the poly(glycidyl ether) polymer or polymer blend can form a bicontinuous microemulsion.

In some embodiments, the poly(glycidyl ether) polymer is copolymerized with ethylene oxide or blended with another polyether such as poly(tetrahyrdofuran), poly(trimethylene oxide), poly(ethylene oxide), or poly(propylene oxide), or a combination thereof.

In some embodiments, the poly(glycidyl ether) polymer is blended with one or more linear or non-linear block copolymers, each block copolymer comprising poly(glycidyl ether) covalently bound to a polymer that is a mechanically strong solid at room temperature. In such embodiments, the blend can form highly swollen, ionically-conductive, mesoscopic poly(glycidyl ether) domains adjacent to another domain rich in a mechanically strong block, or one or more of each block copolymer in the blend can be in the form of a miktoarm star, or a combination thereof.

In any embodiment, the composition can include an ionic liquid. Also, the composition in any embodiment can further include an organic solvent that enhances ionic conductivity of the composition.

In embodiments of this application, a polymer electrolyte composition includes a metal salt and at least one polymer comprising poly(glycidyl.ether). Examples of metal salts include, but are not limited to, conventional alkali metal salts such as halides (bromides, chlorides, etc.), sulfates, nitrates, sulfides, hydrides, nitrides, phosphides, sulfonamides, triflates, thiocynates, perchlorates, or selenides, of lithium, sodium, potassium, magnesium, calcium, or silver, or a combination thereof. Also included are salts such as lithium bis(trifluoromethyl sulfonimide), LiSCN, LiN(CN)$_2$, LiClO$_4$, LiBF$_4$, LiPF$_6$, LiAsF$_6$, LiCF$_3$CO$_3$, LiN(SO$_2$CF$_3$)$_2$, LiC(SO$_3$CF$_3$)$_2$, or LiN(SO$_3$C$_2$F$_5$)$_2$, or a combination thereof.

Examples of glycidyl ether monomers include, but are not limited to, methyl glycidyl ether, ethyl glycidyl ether, n-propyl glycidyl ether, allyl glycidyl ether, iso-propyl glycidyl ether, n-butyl glycidyl ether, iso-butyl glycidyl ether, tert-butyl glycidyl ether, or monomethyl oligo(ethylene glycol) glycidyl ether.

The poly(glycidyl ether) is selected to be amorphous at ambient temperature, which includes room temperature, or temperatures in the range of about −20° C. to about 80° C. Stereoirregular poly(glycidyl ether)s are typically amorphous at relevant temperatures, but have glass transitions, which can make them glassy solids at sufficiently low temperature; the glass transition temperatures are usually below −20° C. The poly(glycidyl ether) can be described as amorphous, generally non-crystalline, or liquid, or behaving in an amorphous, non-crystalline or liquid manner, at ambient temperature.

In any embodiment where the poly(glycidyl ether) has the following structure (I), (II), (III) or (IV):

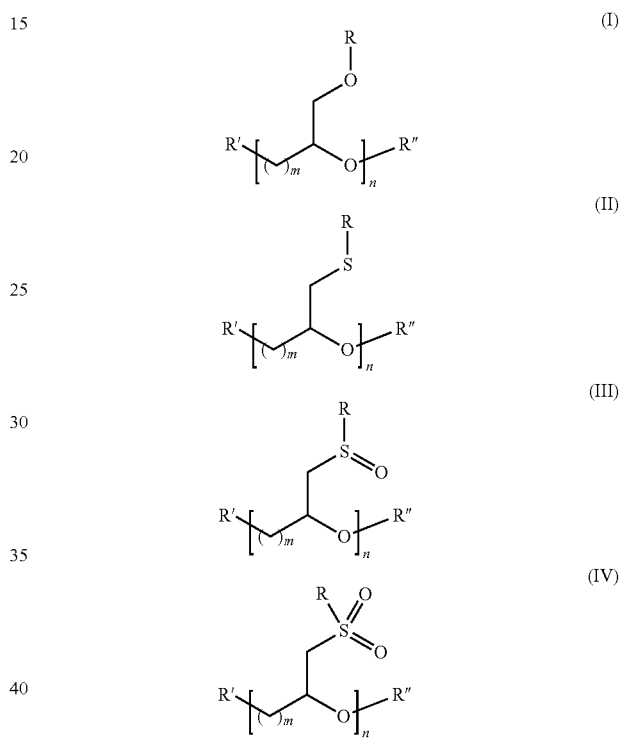

R can be hydrogen or an aliphatic or aromatic group, R' can be hydrogen, an aliphatic or aromatic group, an ether of an aliphatic or aromatic group, azide (N$_3$), a halogen (F, Cl, Br, I), or a perfluoroalkane, and R" can be hydrogen or an aliphatic or aromatic group. Any combination of R, R', R", m and n is contemplated. For example, with any R, m value and n value, R' can be an O-phenyl group, and R" can be a methyl group or hydrogen.

In some embodiments, the poly(glycidyl ether) has the following structure (V), which is an example of an ether linkage of an aliphatic or aromatic R' group:

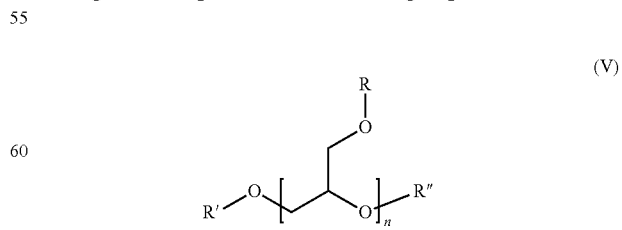

where R, R' and R" in structure (V) are each independently hydrogen or an aliphatic or aromatic group, and n≥2 or in particular 2-2000

As used herein, an aliphatic group is an acyclic or cyclic, saturated or unsaturated, non-aromatic hydrocarbyl group, which can be optionally substituted. Examples of aliphatic groups include, but are not limited to, alkyl, alkenyl, and alkynyl groups. The term "alkyl" refers to a branched or unbranched saturated hydrocarbyl group such as methyl, ethyl, n-propyl, isopropyl, n-butyl, isobutyl, t-butyl, octyl, decyl, and the like, as well as cycloalkyl groups such as cyclopentyl, cyclohexyl and the like. The term "alkenyl" refers to a branched or unbranched hydrocarbon group containing at least one double bond, such as allyl, ethenyl, n-propenyl, isopropenyl, n-butenyl, isobutenyl, octenyl, decenyl, and the like as well as cycloalknyl groups. The term "alkynyl" refers to a branched or unbranched hydrocarbon group containing at least one triple bond, such as ethynyl, n-propynyl, isopropynyl, n-butynyl, isobutynyl, and the like, as well as cycloalkynyl groups.

An aromatic group is an aromatic hydrocarbyl group containing a single aromatic ring or multiple aromatic rings that are fused together, linked covalently, or linked to a common group such as a methylene or ethylene moiety. The aromatic hydrocarbyl group can be optionally substituted. Examples of aromatic groups include, but are not limited to, phenyl, naphthyl, biphenyl, diphenylether, diphenylamine, and benzophenone.

The term "substituted" refers to an aliphatic or aromatic group in which one or more bonds to a hydrogen atom contained within the group is replaced by a bond to a non-hydrogen atom of a substituent group. Examples of non-hydrogen atoms include, but are not limited to, carbon, oxygen, nitrogen, phosphorus, and sulfur. Examples of substituent groups include halo, hydroxy, amino, alkoxy, aryloxy, nitro, ester, ether, amide and hydrocarbyl groups. The substituent may be a functional group such as hydroxyl, alkoxy, thio, phosphino, amino, or halo.

An ether of an aliphatic or aromatic group can be represented as $R_a$—O—, where $R_a$ is an aliphatic or aromatic group, and O is connected to the polymer backbone. Examples of such ethers include alkoxy groups such as O-propyl, and aryloxy groups such as O-phenyl.

A perfluoroalkane can have the formula $O_wC_xH_yF_z$ where w=0 to 2, x=1 to 19, y=2x+2-z, and z=1 to (2x+2).

In particular embodiments, the aliphatic group of can be methyl, ethyl, propyl, allyl, butyl, pentyl, or hexyl, oligo (ethylene oxide), or other oligoether. In particular embodiments, the aromatic group can be a phenyl, diphenyl, or benzyl group. In certain embodiments, the aliphatic or aromatic group is a $C_{1-9}$ group. In some embodiments, the aliphatic and/or aromatic group can be propyl, isopropyl, sec-butyl, isopentyl, benzyl, diphenylmethyl, or allyl. In certain embodiments of structures (I)-(IV), with any R or R" group, R' can be propyl, isopropyl, sec-butyl, isopentyl, benzyl, diphenylmethyl, or allyl, or can be an ether of any of these groups. Similarly, in certain embodiments of structures (I)-(IV), with any R or R' group, R" can be propyl, isopropyl, sec-butyl, isopentyl, benzyl, diphenylmethyl, or allyl. In certain embodiments of structures (I)-(IV), with any R group, R' can be propyl, isopropyl, sec-butyl, isopentyl, benzyl, diphenylmethyl, or allyl, or can be an ether of any of these groups and, independently, R" can be propyl, isopropyl, sec-butyl, isopentyl, benzyl, diphenylmethyl, or allyl. Also, in certain embodiments of structure (V), with any R or R" group, R' can be propyl, isopropyl, sec-butyl, isopentyl, benzyl, diphenylmethyl, or allyl. Also, in certain embodiments of structure (V), with any R or R' group, R" can be propyl, isopropyl, sec-butyl, isopentyl, benzyl, diphenylmethyl, or allyl. In addition, in certain embodiments of structure (V), with any R group, R' and R" can each independently be propyl, isopropyl, sec-butyl, isopentyl, benzyl, diphenylmethyl, or allyl. Further, the aliphatic and/or aromatic groups in particular embodiments can be a substituted alkyl or aryl group, which may also contain chemical functionalities in a protected form such as an N,N-dibenzyl-ethanolamine group, or in a deprotected form such as $H_2NCH_2CH_2O$—. Any combination of aliphatic and/or aromatic groups, including substituted aliphatic and/or aromatic groups, is contemplated for R, R' and R" in structures (I)-(IV), structure (V), and structures (VI) and (VII).

In any embodiment including random or statistical copolymers, the copolymer can comprise a copolymer of two or more glycidyl ether monomers. Examples of such copolymers include, but are not limited to, poly[(methyl-glycidyl-ether)-co-(allyl glycidyl ether), poly[(methyl glycidyl ether)-co-(n-butyl glycidyl ether)], or poly[(methyl glycidyl ether)-co-(n-butyl glycidyl ether)]. The poly(glycidyl ether) can be made under conditions that result in branched or linear copolymers of, for example, one or more glycidyl ether monomers with allyl glycidyl ether, poly(allyl glycidyl ether) backbone with oligo(ethylene oxide) side-chains, or another polyglycidyl ether such as poly(methyl glycidyl ether). Hyperbranched copolymers can be made by polymerizing glycidol with a glycidyl ether monomer such as methyl glycidyl ether.

In any embodiment including a thiol-ether linkage between the pendant ether and polymer backbone, examples of the thiol-ether linkage include, but are not limited to, a thioglycolic acid ether linkage or a simple thio-ether linkage between poly(allyl glycidyl ether) and a thiol-terminal poly (ethylene oxide), shown in structures (VI) and (VII), respectively.

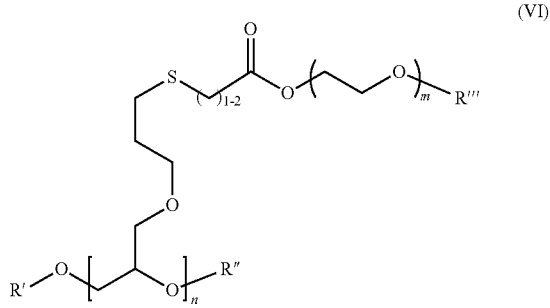

(VI)

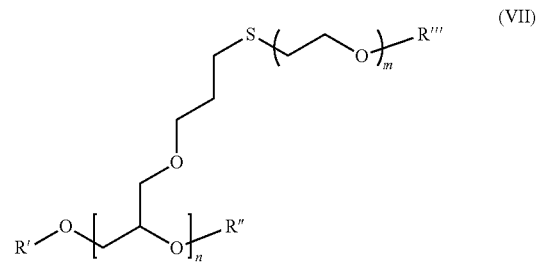

(VII)

In these structures, R', R", and R'" are each independently hydrogen or an aliphatic or aromatic group, n≥2 or more particularly 2-2000, and m=1-12 or more particularly 1-6. In particular embodiments, the aliphatic or aromatic group can be propyl, isopropyl, sec-butyl, isopentyl, benzyl, diphenylmethyl, or allyl. In some embodiments, with any R" and R'" group, R' can be propyl, isopropyl, sec-butyl, isopentyl, benzyl, diphenylmethyl, or allyl. Similarly, in some embodiments, with any R' and R'" group, R" can be propyl, isopropyl, sec-butyl, isopentyl, benzyl, diphenylmethyl, or allyl. Also, in some embodiments, with any R''' group, R' and R'' can each independently be propyl, isopropyl, sec-butyl, isopentyl, benzyl, diphenylmethyl, or allyl. In particular embodiments of structure (VI) and (VII), with any R', R'', n and m, the R''' group can be methyl, ethyl, or allyl. Any combination of R', R'', R''', m and n is contemplated.

In any embodiment including a mechanically strong solid polymer, examples of such polymers include, but are not limited to, polystyrene, polyacrylate, polymethacrylate, polycarbonate, polyethylene, polypropylene, or polyamide. A mechanically strong solid polymer or polymer block is one that is glassy, crosslinked, or semi-crystalline at room temperature (about 25° C.) to about 80° C.

In any embodiment including block copolymers, examples of block copolymers include, but are not limited to, a linear or branched triblock copolymer, a miktoarm star, a diblock copolymer, a star block copolymer, a graft copolymer, or a multiblock polymer, e.g., a triblock terpolymer. A mixtoarm star block copolymer structure is shown in FIG. 1.

A bicontinuous microemulsion is a polymer morphology in which two or more chemically distinct domains are present, with each such domain percolating to form a connected path through the composition. Prior to solidification, the bicontinuous microemulsion is an equilibrium morphology that is persistent in time. A bicontinuous microemulsion in some embodiments is formed by, for example, blending together two homopolymers (A and B) and a small amount (about 1% to about 50%) of a diblock copolymer comprising A and B. Typically, around 10% of diblock copolymer yields the bicontinuous microemulsion, which in such embodiments has a percolating domain of A polymer segments and a percolating domain of B polymer segments.

A poly(glycidyl ether) polymer is blended with a block copolymer in some embodiments to form highly swollen, ionically-conductive, mesoscopic poly(glycidyl ether) domains adjacent to another domain rich in a mechanically strong block. For example, a composition can be formed by a binary blend of block copolymer and a poly(glycidyl ether), with the block copolymer comprising a poly(glycidyl ether) block and a mechanically strong polymer block. In some embodiments containing domains rich in a mechanically strong block, the mechanically strong block domain is comprised of ≥80%, ≥85%, ≥90%, ≥95%, or ≥99%, of a mechanically strong polymer. The ionically-conductive domains can conduct charge-carrying metal ions, such as lithium ions, in an electrochemical cell, such as a battery.

In any embodiment including an ionic liquid, examples of ionic liquids include, but are not limited to, 1-butyl-3-methylimidazolium bis(trifluoromethane sulfonyl)imide or N-methyl-(n-butyl)pyrrolidiinium bis(trifluoromethanesulfonyl)imide. In embodiments including an organic solvent, examples of organic solvents include, but are not limited to, ethylene carbonate, diethylene carbonate, propylene carbonate, or dimethyl carbonate, or a mixture thereof.

The poly(glycidyl ether) polymers considered herein can be used to prepare electrolyte compositions. Thus, a method of preparing an electrolyte composition is provided, where the method comprises mixing or combining a metal salt and a polymer comprising poly(glycidyl ether), wherein the poly(glycidyl ether) is amorphous at ambient temperature. Any embodiment of the poly(glycidyl ether) polymers described herein can be used, including polymers of structures (I)-(IV) and (V)-(VII). In any embodiment, the method can also include adding an ionic liquid to the composition. Also, in any embodiment, the method can further include adding an organic solvent to the composition, where the organic solvent enhances ionic conductivity of the composition.

Figure 2:
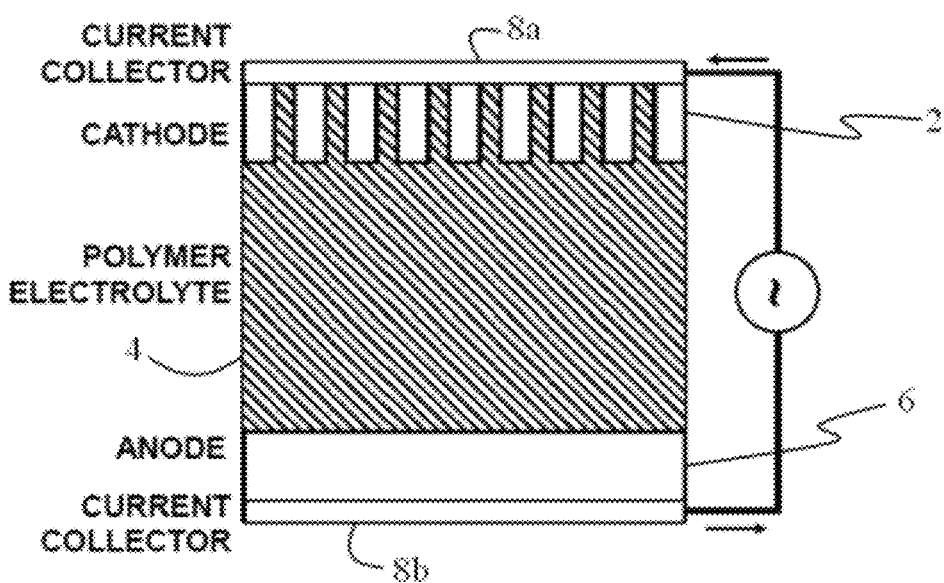
FIG. 2 is a schematic drawing of a lithium polymer battery.

The polymer electrolyte composition considered herein can be incorporated into a battery, such as a lithium polymer battery. The battery can comprise a polymer electrolyte between a cathode and anode. A mechanical separator can be included in the polymer electrolyte. The device can be sandwiched between two current collectors. FIG. 2 is a schematic drawing of a lithium polymer battery. Arrows denote the direction of ion transport and current. The battery includes a cathode 2, a polymer electrolyte 4, and an anode 6 held between two current collectors 8a,8b. A mechanical separator may or may not be included in various embodiments.

Further, the polymer electrolyte composition considered herein can be incorporated into an electrochromic window. An electrochromic window is a window that can be lightened or darkened electronically. The polymer electrolyte is placed between two transparent oxide windows and serves as a layer to transport ions from the storage layer to the electrochromic layer.

Although various components of the polymer electrolyte composition have been described separately, it should be understood that any embodiment of one component is contemplated to be combined with any embodiment of another component. Thus, for example, any combination of metal salt and polymer comprising poly(glycidyl ether), or any combination of metal salt, polymer comprising poly(glycidyl ether) and mechanically strong solid polymer, is envisioned. Similarly, although various features of the methods have been described separately, it should be understood that any embodiment of one feature is contemplated to be combined with any embodiment of another feature. Also, with regard to batteries or other devices, any embodiment of one component is contemplated to be combined with any embodiment of another component.

The present invention may be better understood by referring to the accompanying examples, which are intended for illustration purposes only and should not in any sense be construed as limiting the scope of the invention.

Example 1

A polymer electrolyte that is inexpensive, straight-forward to produce, able to dissolve lithium salts, and promotes lithium ion conduction at ambient temperatures is valuable for wide-scale commercialization of lithium-polymer batteries. Thus, PEO use is eschewed in favor of a polymer electrolyte that is amorphous over all useful temperatures, can be synthesized in one or two steps and conducts lithium ions, as well as be easily incorporated in a solid electrolyte layer in a battery. Poly(glycidyl ethers) (PGEs) potentially offer these desirable traits as they are similar to PEO in synthetic route but contain pendant groups that tend to inhibit crystallization. The large family of glycidyl ether monomers available also presents the opportunity for tailoring a PGE-based material to be an optimal electrolyte.

Figure 3:
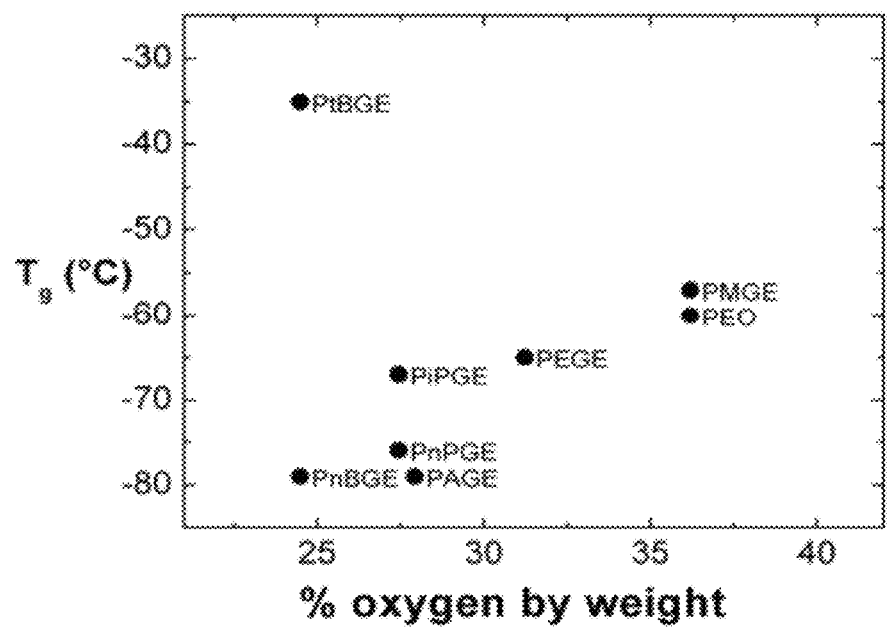
FIG. 3 is a chart showing glass transition temperature ($T_g$) and oxygen content of PEO [16], poly(methyl glycidyl ether) (PMGE) [17], poly(ethyl glycidyl ether) (PEGE) [18], poly (allyl glycidyl ether) (PAGE) [19], poly(n-propyl glycidyl ether) (PnPGE) [20], poly(isopropyl glycidyl ether) (PiPGE) [21], poly(n-butyl glycidyl ether) (PnBGE) [21], and poly (tertbutyl glydidyl ether) (PtBGE) [21]. The $T_g$ appears to be approximately linearly correlated to oxygen content except in the case of bulky side-chains (PtBGE).

FIG. 3 depicts the properties considered important to electrolyte performance for a number of PGE homopolymers. An ideal polymer electrolyte would contain a large fraction of oxygen to promote salt dissociation as well as would have a low glass transition temperature indicative of increased segment mobility and ion transport. As can be seen from the poly(n-alkyl glycidyl ethers), improvements from decreasing $T_g$ by lengthening the side group are offset by the accompanying decrease in oxygen content. Of the PGEs shown, poly (allyl glycidyl ether) (PAGE) and poly(n-butyl glycidyl ether) (PnBGE) have the lowest $T_g$, around −78 to −80° C.

Example 2

For a study of the poly(glycidyl ether)s as potential polymer electrolytes, PAGE has been selected for further investigation not only because of its low $T_g$, but its higher oxygen content over PnBGE suggests greater solvating ability to incorporate more lithium into the system. Previous use of PAGE in polymer electrolytes has limited the role of AGE units to providing cross-linking functionalities in statistical or block copolymers of ethylene oxide with allyl glycidyl ether 2,3,5-7]. In these instances, the amount of AGE incorporated in the polymer was no greater than 48%. Moreover, the dangling allylic functionality has been completely eliminated through cross-linking. To our knowledge, no study has reported the ionic-conductivity and solvating properties of the PAGE homopolymer, which by its low $T_g$ and high oxygen content should be a good polymer electrolyte. Additionally, PAGE is entirely amorphous, suggesting that a PAGE-based electrolyte could be utilized in a room temperature battery in place of PEO. Finally, the chemistry of PAGE is well understood and can be controlled to high molecular weights and low PDIs [19], making PAGE a model system to explore the potential of PGEs as polymer electrolytes for lithium-polymer batteries.

Materials and Sample Preparation

Bis(trifluoromethylsulfonimide) (LiTFSI) was purchased from Sigma-Aldrich and dried in vacuo. PAGE was synthesized via anionic ring opening polymerization in accordance with known methods described in detail elsewhere [19]. Allyl glycidyl ether (AGE) was purchased from TCI America, degassed by three freeze-pump-thaw cycles, stirred over butyl magnesium chloride, and distilled prior to use. The purified AGE was polymerized in the melt at 40° C. with a potassium benzoxide initiator and terminated with methanol. A radical inhibitor (0.01% wt BHT) was added to prevent cross-linking. A 14 kg/mol (PDI=1.14) PAGE was used for $^{13}$C NMR studies while 29 kg/mol (PDI=1.10) PAGE was used for all other investigations. 20 kg/mol PEO was purchased from Sigma-Aldrich and dried in vacuo before use. Molecular weights were determined by 1H NMR and polydispersity indices were determined by size exclusion chromatography.

To prepare the polymer electrolytes, the polymers were mixed with LiTFSI. PAGE-LiTFSI mixtures were stirred at 50° C. for at least three hours. P EO-LiTFSI mixtures were prepared by heating PEO to 80° C. until molten and adding LiTFSI, then stirred at 80° C. for at least one hour. The PAGE-LITFSI and the PEO-LITFSI mixtures were prepared and stored in a dry glove box ($H_2O$<0.1 ppm) under an argon atmosphere.

Polymer Electrolyte Characterization

A glass cell containing two platinum electrodes supplied by Topac, Inc. was immersed in the polymer-salt mixture and sealed under argon. Ionic conductivities were then measured by ac impedance spectroscopy performed on a VMP3 potentiostat using EC-Lab software. The complex impedance spectra were collected over the frequency range of 500 kHz to 10 mHz. Each sample was equilibrated at the given temperature for at least one hour prior to measurement, and measurements were collected on both heating and cooling cycles. Measured temperatures are accurate to with +/−1° C. The cell constant provided by the manufacturer was confirmed using a 0.01M potassium chloride solution.

Differential scanning calorimetry thermograms were collected using a TA Instruments Q2000 MDSC at a heating rate of 2° C./min. The glass transition temperature ($T_g$) was determined as the inflection point on the second heating cycle from −90° C. to 100° C. FT-IR spectra of PAGE-LiTFSI complexes were acquired on a Perkin Elmer ATR-FTIR under ambient conditions. $^{13}$C and $^1$H NMR spectroscopy was carried out on a Bruker AVANCE500 spectrometer at room temperature. $^{13}$C NMR was performed in the melt by inserting a sealed capillary containing $D_2O$ for locking and shimming into pure PAGE-LiTFSI in an NMR tube.

Results and Discussion

Figure 4:
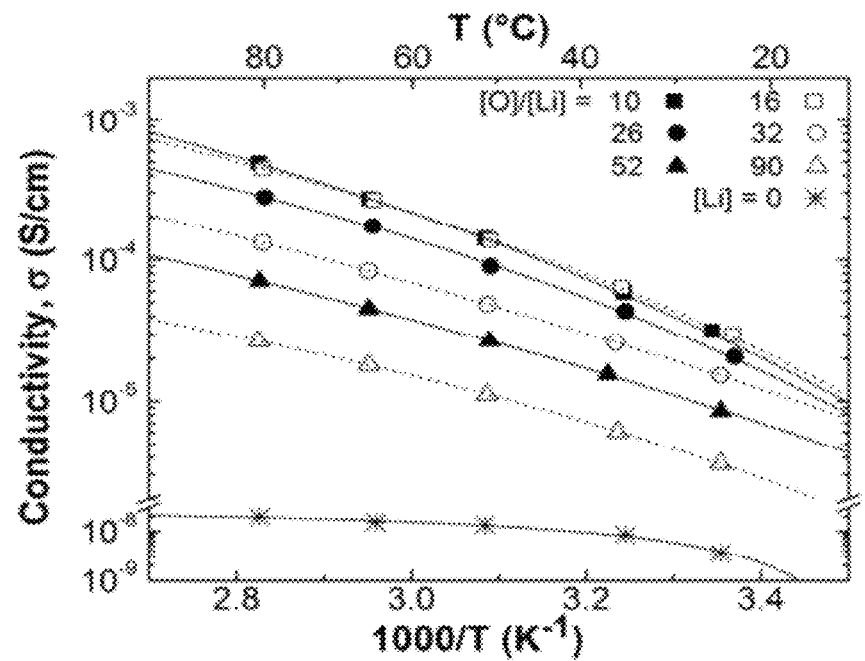
FIG. 4 is a graph of ionic conductivity ($\sigma$, S/cm) of PAGE-LiTFSI complexes versus temperature (top) and 1000/T (bottom) for PAGE-LiTFSI complexes for several concentrations of lithium. Lines are fits of the VTF equation to the data.

The conductivity of PAGE-LiTFSI complexes are shown in FIG. 4 as a function of temperature for several LiTFSI concentrations ([O]/[Li]=90-10). Prior to addition of LiTFSI, the conductivity of the pure, undoped PAGE material was measured. A desirable feature of any polymer electrolyte is that its electrical conductivity is low, while ionic conductivity is high [22]. Over the entire temperature range investigated (25-80° C.), the conductivity of pure PAGE is extremely low, <$10^{-8}$ S/cm, assuring that any salts remaining from the synthesis contribute little to the measured ionic conductivity. Once a small amount of LiTFSI is added ([O]/[Li]=90), the conductivity increases approximately three orders of magnitude, demonstrating the good transport properties of dissociated lithium ions in PAGE. Fits to the Vogel-Tammann-Fulcher (VTF) equation (1):

$$\sigma(T) = \sigma_0 \exp\left[\frac{-E_a}{R(T-T_0)}\right] \quad (1)$$

are shown in FIG. 4 as dashed or dotted lines for each data series. The ionic conductivity of PAGE continues to increase with increasing salt concentration up to a high loading of [O]/[Li]=10, or approximately ⅓ LiTFSI by weight, where the conductivity reaches a maximum with respect to LiTFSI concentration. Maximum mobility and conductivity are achieved between [O]/[Li]=10-16.

Figure 5:
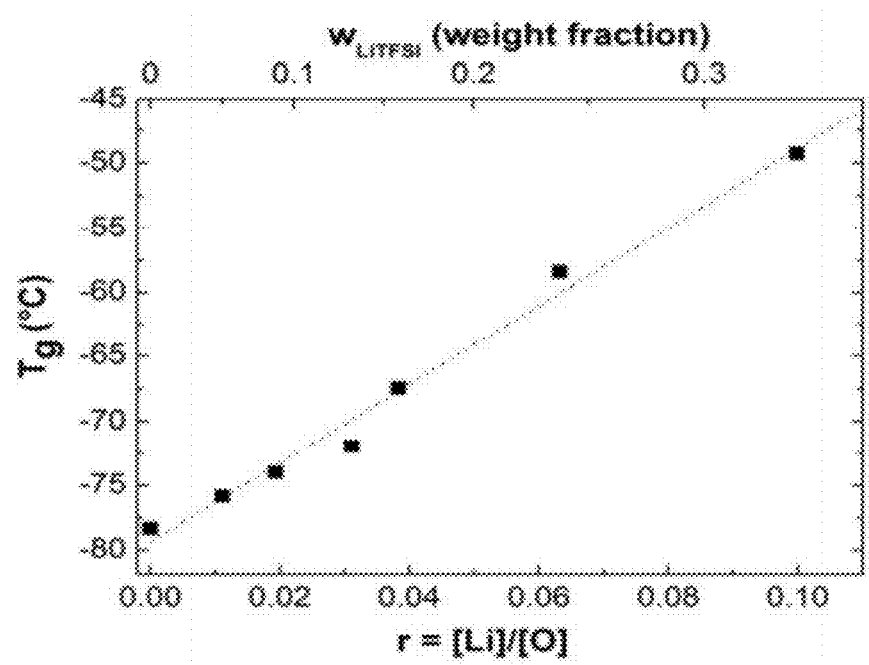
FIG. 5 is a graph of Tg as determined by DSC versus lithium concentration, [Li]/[O]. On the top axis, weight fraction of LiTFSI in electrolyte is given. $T_g$ increases linearly with [Li]/[O]. The dashed line is a linear fit to the data.

Lithium ions are solvated by coordination to oxygen heteroatoms in the PAGE backbone. This has consequences for the segmental mobility of the polymer; the corresponding increase in $T_g$ with LiTFSI concentration is shown in FIG. 5. Reduction in improvement of the conductivity between [O]/[Li]=10-16 is consistent with ion mobility depending on local segmental motion. As more salt is added, the $T_g$ climbs almost linearly with increasing salt incorporation. À t the highest loading, [O]/[Li]=10, the $T_g$ has increased to −49° C. The coordinated lithium ions function as crosslinks by complexing with two or more chains. In this view, the $T_g$ climb is wholly congruent with the known cross-linking effects in polymers [6]. The temperature dependence of ionic conductivity over all salt concentrations is well described by the VTF equation (1) in which $\sigma_0$ is related to the maximum number of charge carriers, B is a temperature proportional to the apparent activation energy of ion-conduction/segmental motion, and $T_0$ is the reference temperature, chosen here to be the glass transition temperatures shown in FIG. 5. The VTF fits are shown as dashed and dotted lines in FIG. 4 and the determined parameters are given in Table 1. As expected, with increasing addition of salt, the number of charge carriers increases, suggesting that the added salt also dissociates at high concentrations. The apparent activation energy, B, reaches a maximum at [O]/[Li]=26, implying that above this concentration, there may be a change in the mode, or energetics of ion conduction. This is supported by the charge carrier density, $\sigma_0$, when considered on a per mole Li basis, the maximum charge carriers per mole Li is also seen at [O]/[Li]=26.

TABLE 1

Glass transition temperatures and VTF parameters for polymer electrolytes.

| [O]/[Li] | $W_{LiTFSI}$ | $T_g$ (° C.)$^a$ | $E_a$ (kJ/mol) | $\sigma_0$ (S/cm) |
|---|---|---|---|---|
| [Li] = 0 | 0.00 | −78.0 | 3.13 | $2.16 \times 10^{-7}$ |
| 90 | 0.05 | −75.8 | 4.77 | $1.04 \times 10^{-3}$ |
| 52 | 0.09 | −74.0 | 5.06 | $3.59 \times 10^{-3}$ |
| 32 | 0.13 | −72.0 | 5.14 | $7.59 \times 10^{-3}$ |
| 26 | 0.16 | −67.5 | 5.36 | $2.22 \times 10^{-2}$ |
| 16 | 0.24 | −58.4 | 4.86 | $3.04 \times 10^{-2}$ |
| 10 | 0.33 | −49.3 | 4.51 | $3.15 \times 10^{-2}$ |

$^a$Measured by DSC. $T_0$ set to $T_g$ in VTF fits to conductivity data. Ionic conductivity can be related by:

$$\sigma(T) = \sigma_0 e^{\frac{-E_0}{R(T-T_0)}}$$

Figure 6:
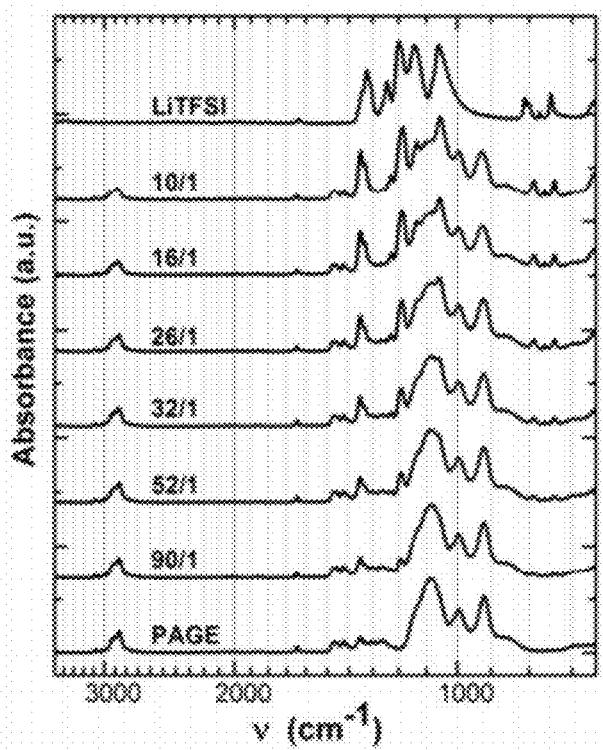
FIG. 6 is a panel of infrared spectra of PAGE, LiTFSI, and PAGE-LiTFSI complexes at several concentrations: [O]/[Li] =90, 52, 32, 26, 16, and 10.

Comparison with the ionic conductivity of PEO as a function of [Li]/[O] is complicated due to the fact that half of the oxygen heteroatoms in PAGE used to calculate this ratio are located in the allyl-ether side-chain. The peak ionic-conductivity of PAGE occurs near [Li]/[O]=16. This is approximately the same as that for PEO [8]. Infrared (FT-IR) spectroscopy was used to investigate the interaction between PAGE and the LiTFSI salt; A series of FT-IR spectra of pure PAGE, LiTFSI, and several concentrations of LiTFSI in PAGE are shown in FIG. 6.

LiTFSI dissociates in the presence of PAGE as indicated by the vibrational shifts of the TFSI anion from 810, 773, and 749 cm$^{-1}$ to 787, 761, and 739 cm$^{-1}$ [23]. Inversion of the peak intensities at 1350 cm$^{-1}$ and 1320 cm$^{-1}$, and the shifts in the signals at 1200, 1140, and 1160 cm$^{-1}$ to lower wavenumbers are all consistent with a completely dissociated TFSI anion. Although nearly all the vibrations of LiTFSI shift upon solvation in PAGE, changes in the IR spectrum of PAGE itself are less obvious. It is worth noting that stretches at 3079 cm$^{-1}$, 1646 cm$^{-1}$, and 995 cm$^{-1}$, assigned to C—H and C=C alkene vibrations, do not shift even at the highest concentrations of LiTFSI salt. Thus it is believed that there is little interaction between the LiTFSI and the alkene moiety in PAGE. Conversely, the broad ether stretch at 1084 cm$^{-1}$ shifts to higher wavenumbers; deconvolution of this peak with the strong LiTFSI signals in the same region is not possible. However, a weak band at 2864 cm$^{-1}$ and its higher wavenumber shoulder, assigned to C—H stretches in the backbone, similarly shift to greater wavenumber. A strong signal at 919 cm$^{-1}$ likewise shifts to higher wavenumbers upon addition of salt, but the peak is not identified. However, it is believed that this signal shift is due to a cooperative ether motion in PAGE that interacts strongly with the solvated LiTFSI.

Figure 7:
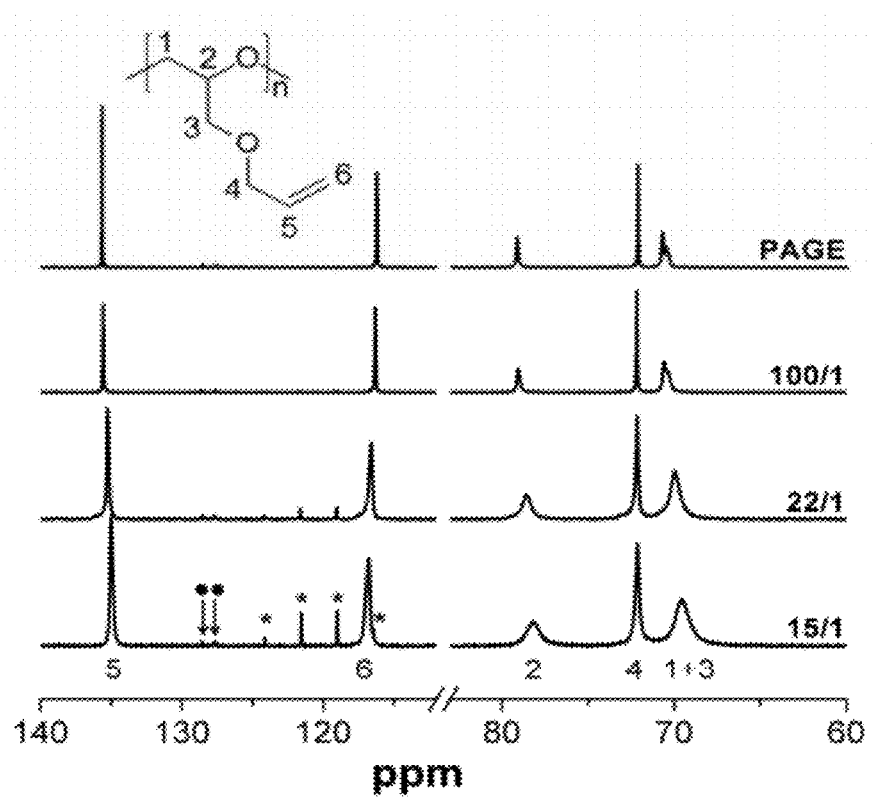
FIG. 7 is a panel of $^{13}$C NMR spectra of PAGE (top) and PAGE-LiTFSI mixtures. Peak assignments are labeled corresponding to the top structure. All carbons shift upfield except C1 which shifts downfield and C4 which does not shift. Circles denotes peaks arising from the benzylic end group. Asterisks denote appearance of quartet arising from $CF_3$ in the TFSI anion.

The role of the alkene and ethers is better resolved through $^{13}$C NMR of PAGE-LiTFSI com-plexes, as shown in FIG. 7. Peak assignments are consistent with previous assignments [19] and were confirmed via 13C NMR APT experiments. Methylene carbons C1 and C3 (see FIG. 7) are overlapping and have been assigned indistinctly. As LiTFSI is added, the CF$_3$ quartet of TFSI an-ion clearly increases in intensity. Comparisons of the salt concentration measured gravimetrically during preparation and by $^{13}$C NMR spectroscopy agree well. Upon increasing salt concentration, C1-C3 shift upfield while C4 does not shift at all. C5 likewise shifts upfield whereas C6 shifts an equal measure downfield. C1-C3 also show significant change in peak shape and broadening, while C4-C6 show comparatively minimal broadening. This suggests that lithium coordination has significantly altered the environment around C1, C2, and C3. This is indicative of strong O—C—C—O coordination with lithium typical of polyethers. As suggested by the symmetric shifts of C5 and C6, the solvent environment around the allyl-group is also changed by the addition of salt, but the effect is much smaller and it is believed that the allyl does not directly interact with the LiTFSI.

Figure 8:
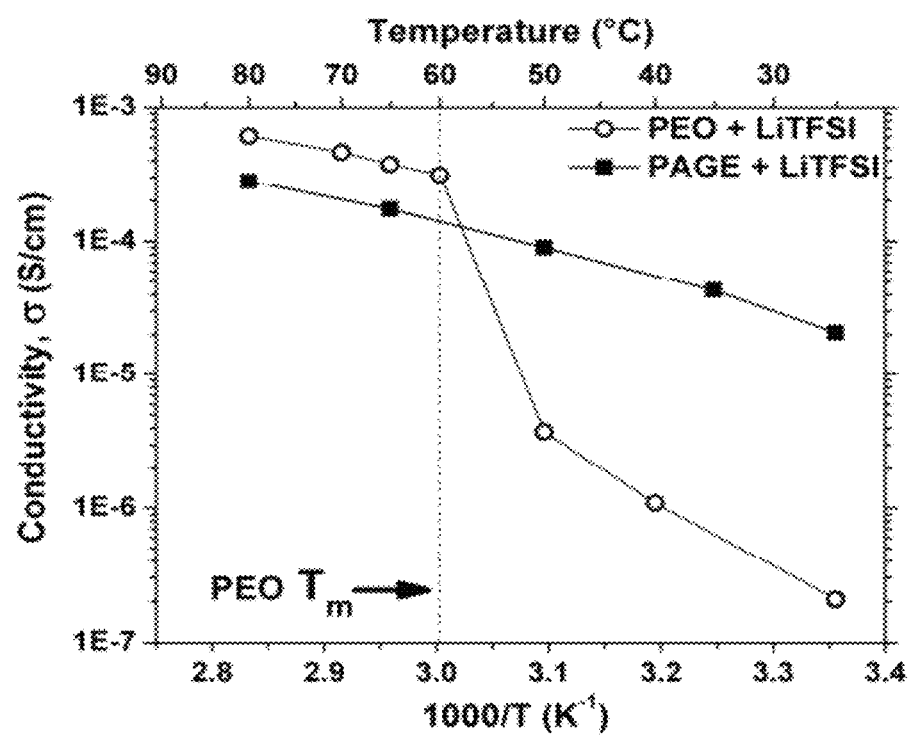
FIG. 8 is a comparison of the ionic conductivity 29 kg/mol PAGE and 20 kg/mol PEO doped with equal weight fraction LiTFSI.

Finally, PAGE was compared directly with a similar-sized PEO at equal weight fractions of LiTFSI incorporation (FIG. 8). Above 60° C., where PEO is completely amorphous, PEO performs slightly better than PAGE at equivalent concentration of LiTFSI. However, below 60° C., PEO conductivity drops significantly as PEO crystallizes. Conversely, PAGE maintains high conductivities as it remains amorphous. At room temperature, the difference in conductivity between PAGE and PEO exceeds two orders of magnitude.

It is noted that at this juncture, PAGE homopolymer is a non-optimal liquid electrolyte due to its higher molar mass and low translational mobility. However, at room temperature, PAGE and the poly(glycidyl ether)s in general are a drastic improvement over the most prevalent polymer electrolyte in use today, i.e., PEO, due to the advantageous thermal properties, and chemical flexibility of the poly(glycidyl ether)s. Thus the advantages of PGEs over PEO are clear. The advantage of PGEs over other liquid electrolytes are in the flexibility to incorporate PGEs into a solid material, and thus the use of highly-energetic metallic anodes, and greater safety due to the non-volatile macromolecular nature of the electrolyte layer.

CONCLUSION

It has been demonstrated that the use of a poly(glycidyl ether), specifically poly(allyl glycidyl ether), as an alternative polymer electrolyte to the ubiquitous poly(ethylene oxide) for a non-aqueous electrolyte layer in batteries that is operable at room temperature. The pendant allyl ether not only inhibits the formation of non-conducting crystalline regions, but also aids in ion solvation and conduction.

REFERENCES

The following publications are incorporated by reference herein in their entirety:

(1) Tarascon, J.; Armand, M. NATURE 2001, 414, 359-367.
(2) Alloin, F.; Sanchez, J.; Armand, M. Electrochimica Acta 1992, 37, 1729-1731.
(3) Alloin, F.; Sanchez, J.; Armand, M. Solid State Ionics 1993, 60, 3-9.
(4) Alloin, F.; Sanchez, J.; Armand, M. Journal of the Electrochemical Society 1994, 141, 1915-1920.
(5) Alloin, F.; Sanchez, J. Electrochimica Acta 1995, 40, 2269-2276.
(6) Cruz, A.; Silva, G.; De Souza, P.; Matencio, T.; Pernaut, J.; De Paoli, M. Solid State Ionics 2003, 159, 301-311.
(7) Matoba, Y.; Shoji, S.; Ikeda, Y. Journal of Applied Polymer Science 2005, 98, 825-830.
(8) Singh, M.; Odusanya, O.; Wilmes, G.; Eitouni, H.; Gomez, E.; Patel, A.; Chen, V. L.; Park, M.; Fragouli, P.; Iatrou, H.; Hadjichristidis, N.; Cookson, D.; Balsara, N. Macro-molecules 2007, 40, 4578-4585.
(9) Panday, A.; Mullin, S.; Gomez, E. D.; Wanakule, N.; Chen, V. L.; Hexemer, A.; Pople, J.; Balsara, N. P. Macromolecules 2009, 42, 4632-4637.

(10) Soo, P.; Huang, B.; Jang, Y.; Chiang, Y.; Sadoway, D.; Mayes, A. Journal of the Electrochemical Society 1999, 146, 32-37.
(11) Nishimoto, A.; Watanabe, M.; Ikeda, Y.; Kohjiya, S. Electrochimica Acta 1998, 43, 1177-1184.
(12) Hawker, C.; Chu, F.; Pomery, P.; Hill, D. Macromolecules 1996, 29, 3831-3838.
(13) Wang, X.; Chen, J.; Hong, L.; Tang, X. Journal of Polymer Science Part B—Polymer Physics 2001, 39, 2225-2230.
(14) Watanabe, M.; Hirakimoto, T.; Mutoh, S.; Nishimoto, A. Solid State Ionics 2002, 148, 399-404.
(15) Matoba, Y.; Matsui, S.; Tabuchi, M.; Sakai, T. Journal of Power Sources 2004, 137, 284-287.
(16) Roux, C.; Gorecki, W.; Sanchez, J.; Jeannin, M.; Belorizky, E. Journal of Physics—Condensed Matter 1996, 8, 7005-7017.
(17) Labbe, A.; Carlotti, S.; Deffieux, A.; Hirao, A. Macromolecular Symposia 2007, 249-250, 392-397.
(18) Poly(ethyl glycidyl ether) was synthesized via anionic ring opening polymerization of ethyl glycidyl ether according to known methods.
(19) Polymer Chemistry, Second Edition. P. C. Hiemenz and T. P. Lodge. CRC Press 2007.
(20) Poly(allylglycidylether) was hydrogenated heterogeneously using Pd on calcium carbonate. The resultant poly(n-propyl glycidyl ether) was filtered and dried in vacuo. Characterization by 1H NMR verified complete hydrogenation, and Tg was measured by DSC.
(21) Yamane, M.; Hirose, Y.; Adachi, K. Macromolecules 2005, 38, 10686-10693. (22) Goodenough, J. B.; Kim, Y. Chemistry of Materials 2010, 22, 587-603.
(23) Rey, I.; Lassegues, J.; Grondin, J.; Servant, L. Electrochimica Acta 1998, 43, 1505-1510

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the invention and the following claims.

What is claimed is:

1. A polymer electrolyte composition, comprising:
    a polymer comprising poly(allyl glycidyl ether) having a composition and structure; and
    a concentration of a metal salt incorporated in the poly(allyl glycidyl ether), wherein:
        the poly(allyl glycidyl ether) is amorphous at ambient temperature, and
        the polymer electrolyte composition has an ionic conductivity of at least $10^5$ S/cm at the ambient temperature.

2. The composition of claim 1, further comprising an organic solvent that enhances the ionic conductivity of the composition.

3. The composition of claim 1, wherein the polymer electrolyte composition has the ionic conductivity in a range of $10^{-5}$-$5\times10^{-4}$ S/cm at one or more temperatures in a range of $-20°$ C. to $80°$ C.

4. The composition of claim 1, wherein the ionic conductivity is equal to or greater than an ionic conductivity of a polymer electrolyte composition based on poly(ethylene oxide) PEO.

5. The composition of claim 1, wherein the poly(allyl glycidyl ether) is amorphous at one or more temperatures in a range of $-20°$ C. to $80°$ C.

6. A polymer electrolyte composition, comprising:
    a metal salt and a polymer comprising poly(glycidyl ether), wherein the poly(glycidyl ether) is amorphous at ambient temperature; and
    an ionic liquid.

7. At least one device selected from a battery, a capacitor, a transistor, and an electrochromic window, the device comprising the polymer electrolyte composition of claim 1.

* * * * *

UNITED STATES PATENT AND TRADEMARK OFFICE
CERTIFICATE OF CORRECTION

PATENT NO. : 8,911,639 B2  Page 1 of 1
APPLICATION NO. : 13/329179
DATED : December 16, 2014
INVENTOR(S) : Nathaniel A. Lynd et al.

It is certified that error appears in the above-identified patent and that said Letters Patent is hereby corrected as shown below:

Claims

Column 16, Line 14,

Claim 1, please delete "$10^5$" and insert --$10^{-5}$--.

Signed and Sealed this
Seventeenth Day of May, 2016

Michelle K. Lee
*Director of the United States Patent and Trademark Office*